United States Patent
Comps et al.

(10) Patent No.: US 6,598,639 B2
(45) Date of Patent: Jul. 29, 2003

(54) TIRE FOR HEAVY EQUIPMENT

(75) Inventors: Olivier Comps, Clermont-Ferrand (FR); Jacques Giraud, Beaumont (FR); Marie-Claude Palgen, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/953,647

(22) Filed: Sep. 17, 2001

(65) Prior Publication Data

US 2002/0007894 A1 Jan. 24, 2002

Related U.S. Application Data

(63) Continuation of application No. PCT/EP00/01669, filed on Feb. 28, 2000.

(30) Foreign Application Priority Data

Mar. 17, 1999 (FR) .............................................. 99 03416

(51) Int. Cl.$^7$ .............................. B60C 9/18; B60C 9/28
(52) U.S. Cl. ........................ 152/526; 152/534; 152/535; 152/538
(58) Field of Search ................................ 152/526, 529, 152/535, 536, 454, 534, 538

(56) References Cited

U.S. PATENT DOCUMENTS 3,580,318 A  *  5/1971  Menell et al. .............. 152/526
4,215,736 A      8/1980  Herbelleau
4,258,775 A      3/1981  Samoto .................. 152/361 R
5,111,864 A  *  5/1992  Nakano et al. ............. 152/526
5,830,295 A     11/1998  Hobbs et al. ............... 152/527

FOREIGN PATENT DOCUMENTS

| DE | 3327670 | 2/1985 |
|---|---|---|
| EP | 600398 | 6/1994 |
| EP | 0600398 | 6/1994 |
| FR | 2421742 | 11/1979 |
| JP | 55132306 | * 10/1980 |
| JP | 59077906 | * 5/1984 |
| JP | 05024413 | * 2/1993 |

* cited by examiner

Primary Examiner—Michael W. Ball
Assistant Examiner—Justin Fischer

(57) ABSTRACT

A tire for heavy equipment, having at least one radial carcass reinforcement surmounted radially to the outside by a crown reinforcement formed of at least three so-called working plies formed of inextensible metal cables, crossed from one ply to the next, forming angles of between 15° and 35° with the circumferential direction. At least one half-ply, formed of inextensible metal cables and of width L', on either side of the equatorial plane XX', is arranged between the edges of at least two radially adjacent working plies, the cables of said half-ply forming with the circumferential direction an angle, which is firstly greater in absolute value than 25°, and secondly is greater in absolute value than the largest angle formed by the elements of the two working plies by an amount between 5° and 15°.

9 Claims, 2 Drawing Sheets

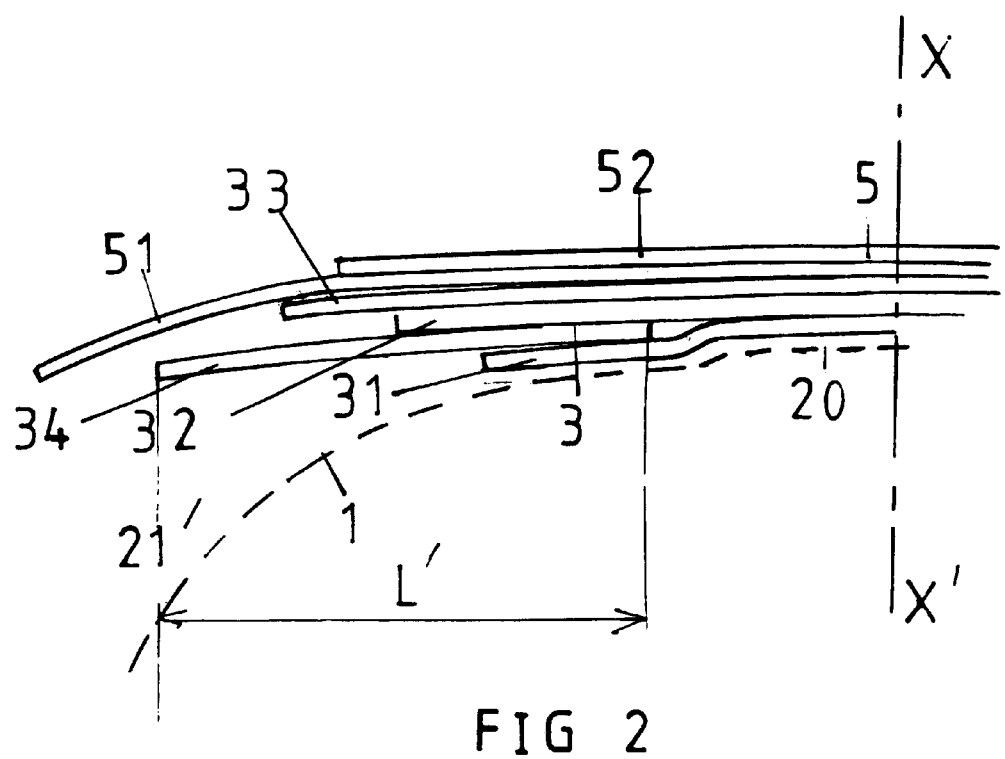
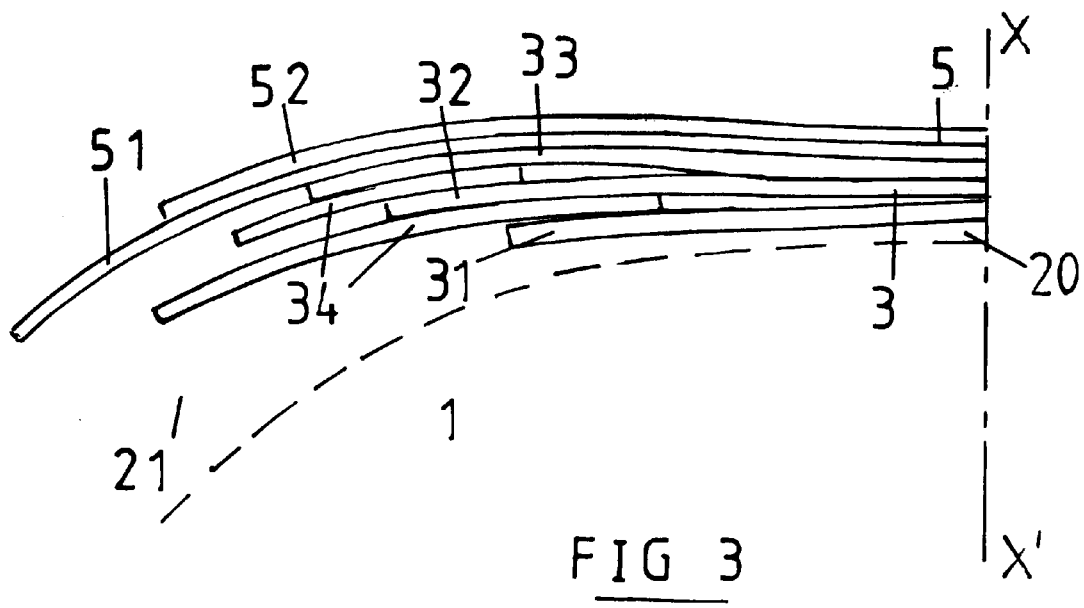

TIRE FOR HEAVY EQUIPMENT

This is a continuation of pending PCT/EP00/01669, filed Feb. 28, 2000.

BACKGROUND OF THE INVENTION

The invention relates to a tire having a radial carcass reinforcement which is intended to be fitted on a heavy vehicle, such as a transport vehicle or construction machinery. It relates more particularly to the crown reinforcement of such a tire.

The prior art construction-vehicle tire shown in FIG. 1 comprises, as is known per se, a carcass reinforcement 1 composed of a single ply of inextensible metal cables made of steel, anchored within each bead to a bead wire 2 to form an upturn 10, the end of which is substantially located at the level $S_0$ of the greatest axial width of the carcass reinforcement. Said carcass reinforcement is radially surmounted by a layer 20 and profiled members 21 of rubber mix, then by a crown reinforcement 3 composed firstly of two plies 31 and 32 referred to as working plies and secondly radially of two so-called protective plies 51 and 52. The working plies are formed of inextensible metal cables made of steel, which are parallel to each other within each ply 31, 32 and are crossed from one ply 31 to the next 32, forming angles which may be between 15° and 45° with the circumferential direction. The axial widths of said working plies are generally between 60% and 80% of the maximum axial width of the carcass reinforcement 1. The protective plies 51, 52 are generally formed of elastic metal cables made of steel, which are parallel to one another within each ply 51, 52 and are crossed from one ply 51 to the next 52, also forming angles which may be between 15° and 45° with the circumferential direction. The widths of said protective plies 51, 52 are usually less than the width of the widest working ply. Finally, the cables of the radially outer working ply 32 are usually crossed with the cables of the radially inner protective ply 51. The crown reinforcement is itself surmounted by a tread 4 which is joined to the two beads 7 by the two sidewalls 6.

As is known, the crown reinforcements of radial tires, and more particularly large-dimension tires, are subjected to great deformation, which causes longitudinal and transverse shearing stresses between the edges of two crossed plies (the longitudinal shearing is greater than the transverse shearing when the cables of crossed plies form small angles with the circumferential direction), at the same time as a delamination stress, a radial stress which tends to separate the edges of the two plies radially. Said stresses are due first and foremost to the inflation pressure of the tire, which means that the so-called belting pressure between the carcass reinforcement and the crown reinforcement tends to cause the circumferential expansion of said crown reinforcement; next they are due to the load borne by the tire when travelling, with a contact surface being produced between the ground and the tire; then finally to the drifting of the tire when travelling. Said shearing stresses generate fissures in the rubber mix adjoining the end of the shortest ply, which fissures spread within said mix and adversely affect the life of a crown reinforcement, and therefore of the tire.

A clear improvement in the endurance was obtained by using in the crown reinforcement at least one protective crown ply having an axial width greater than the width of the axially widest working ply.

Another solution, as noted in French Patent 2 421 742, consists in more favourably distributing the stresses causing separation between working crown plies, following the drifting of the tire, by multiplying the number of working plies, for example by using four working plies of reinforcement elements crossed from one ply to the next, forming angles which may be between 15° and 35° with the circumferential direction and by distributing the reinforcement elements used in the conventional two working plies on the four working plies such that the latter each have the same thickness and the same rigidity in extension measured perpendicular to the reinforcement elements of the ply.

SUMMARY OF THE INVENTION

Multiplication of the working plies is not without its drawbacks, particularly at the center of the reinforcement where the number of plies has a very great influence on the flexural strength of the crown of the tire. The invention proposes increasing the resistance to separation between working plies of a crown reinforcement having a widened protective ply plies and thus to improve the endurance of such a crown reinforcement for a tire for construction machinery, without increasing the number of working plies at the center of the reinforcement.

The tire according to the invention, comprising at least one radial carcass reinforcement anchored within each bead to at least one bead wire, forming an upturn, said reinforcement being surmounted radially to the outside by a crown reinforcement formed of at least three so-called working plies formed of inextensible metal reinforcement elements which are parallel to each other within each ply and are crossed from one ply to the next, forming angles $\alpha$, $\alpha'$ of between 15° and 35° with the circumferential direction, is characterized in that at least one half-ply, formed of inextensible metal reinforcement elements and of width L', on either side of the equatorial plane, is arranged radially between the edges of at least two radially adjacent working plies, the axially outer and inner ends of said half-ply being located, respectively, axially to the outside of the end of the widest working ply and axially to the inside of the end of the least wide working ply, at distances at least equal to the amount L'/5, the reinforcement elements of said half-ply forming with the circumferential direction an angle $\beta$, which is firstly greater in absolute value than 25°, and secondly is greater in absolute value than the largest angle formed by the elements of the two working plies by an amount between 5° and 15°.

Preferably, a half-ply is arranged between the two working plies closest to the carcass reinforcement. Whether there be one or two half-plies, the reinforcement elements of each half-ply are advantageously crossed with the reinforcement elements of the working ply radially to the inside of said half-ply and closest radially to the carcass reinforcement.

The widths of the working plies of the crown reinforcement, which are generally unequal, are such that the working ply radially to the inside of each half-ply is less wide than the ply radially to the outside of said half-ply.

In the case of the presence, on either side of the equatorial plane, of two half-plies arranged between the edges of two radially adjacent working plies of the working reinforcement of three plies, the second half-ply is formed of the same metal reinforcement elements as those of the first half-ply, said elements preferably being crossed with the elements of said first half-ply.

The working ply, as is known per se, is surmounted radially by a protective reinforcement composed of two plies of elastic metal reinforcement elements. One of said protective plies, preferably the radially inner ply, has an axial width greater than the greatest axial width of the working plies, whereas the width of the second protective ply has a width of a value which lies between the values of the widths of the working plies.

The invention will be better understood with reference to the following description, which refers to the drawings, illustrating in non-limitative manner embodiments of the invention.

DESCRIPTION OF THE DRAWINGS

FIG. 2 shows a diagram, viewed in meridian section, of a first variant of the crown reinforcement according to the invention; and FIG. 3 shows a diagram, still in meridian section, of a second variant of a crown reinforcement according to the invention.

DESCRIPTION OF PREFERRED EMBODIMENTS

Figure 1:
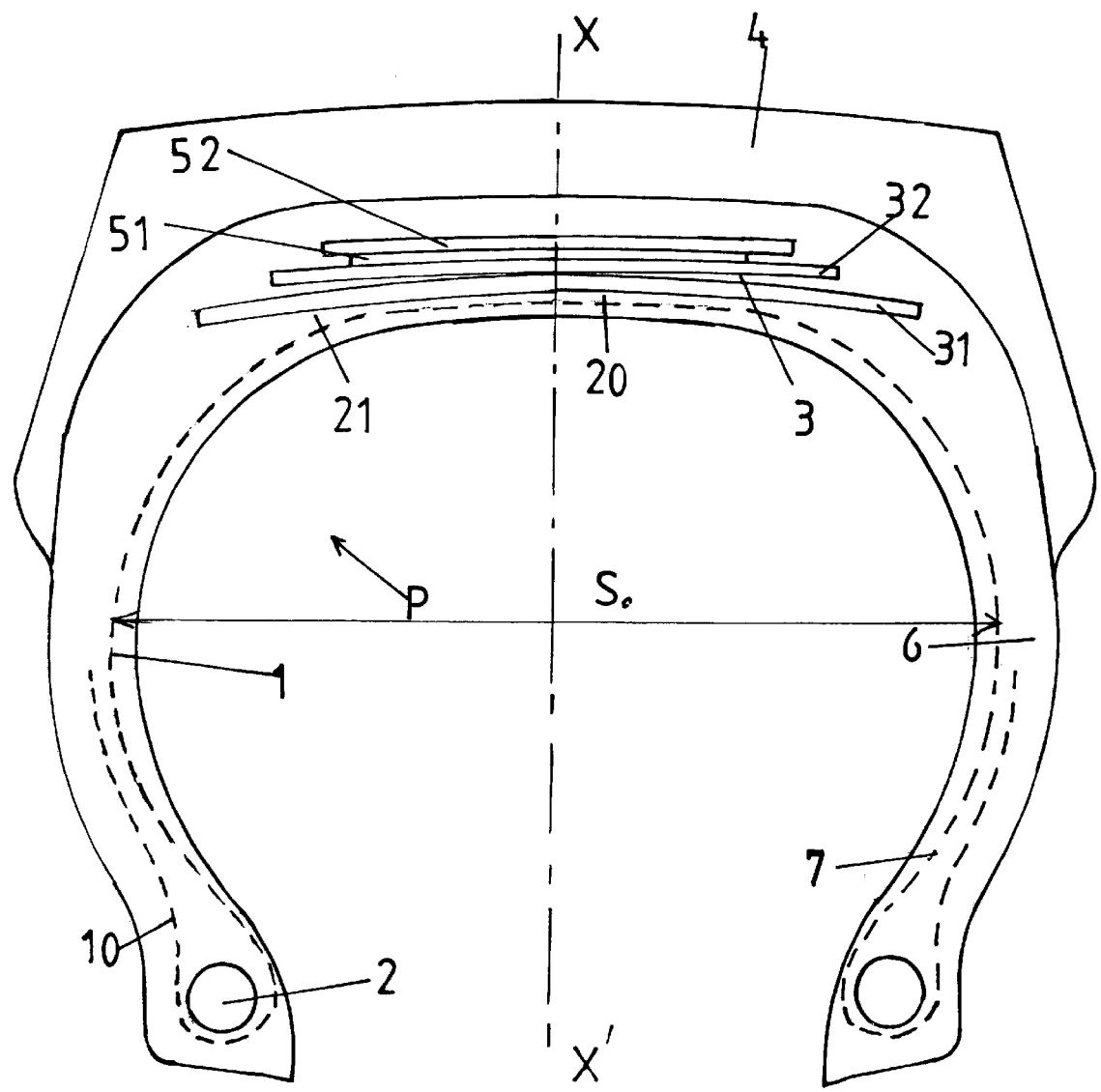
FIG. 1 shows a diagram, viewed in meridian section, of a crown reinforcement for a construction-vehicle tire in accordance with the prior art.

The tire P according to the invention, the crown reinforcement of which is shown in FIG. 2, is a tire for a construction vehicle. Of large dimensions, the H/S form ratio of said tire is equal to 0.80, H being the height of the tire on its rim and S the maximum axial width of the tire, when the latter is mounted on its operating rim and inflated to its recommended pressure.

Said tire P comprises a radial carcass reinforcement composed of a single ply 1 of inextensible metal cables, which is anchored within each bead to at least one bead wire (not shown) to form an upturn, the end of which is substantially located on the straight line of greatest axial width of the carcass reinforcement, which straight line is parallel to the axis of rotation. The carcass ply 1 is surmounted radially, within its central part, by a layer 20 of rubber mix and, in its lateral parts, by two triangular profiled members 21 formed of the same rubber mix, said profiled members making it possible to compensate for the differences in meridian curvature between the carcass reinforcement and the crown reinforcement. Radially to the outside of said layer and profiled members, there is arranged a working crown reinforcement 3 and a protective reinforcement 5.

The working reinforcement comprises first and foremost three working plies 31, 32 and 33 which are axially continuous and of widths $L_{31}$, $L_{32}$ and $L_{33}$, respectively, the least wide ply 31, in the case described, being radially closest to the carcass reinforcement 1 and the widths $L_{31}$, $L_{32}$ and $L_{33}$ increasing radially from the inside to the outside. Said three widths are equal to 0.5 $S_0$, 0.55 $S_0$ and 0.66 $S_0$, respectively, $S_0$ being the maximum axial width of the carcass reinforcement (see FIG. 1). Said three plies 31, 32 and 33 are formed of inextensible metal cables, which are parallel to each other in each ply and are crossed from one ply 31, 32 to the next 32, 33, forming angles $_{1, 2}$ and $_3$ which are equal to +18°, −24° and +18°, respectively, with the circumferential direction of the tire.

Radially between the edges of the least wide ply 31 and the edges of the radially adjacent ply 32 of intermediate width, there are arranged two half-plies 34, formed of the same inextensible metal elements as those forming the plies 31, 32 and 33, said elements being parallel to each other in each half-ply 34 and crossed with the elements of the axially continuous ply 31 closest to the carcass ply 1, forming with the circumferential direction an angle β, greater than the angles $α_1$ and $α_2$ and equal to −33°. The axial width L' of each half-ply 34 is equal to 0.33 $S_0$. The axially inner end of the half-ply 34 is located axially to the inside of the end of the ply 31 and at an axial distance from the equatorial plane XX', such that the difference between the axial half-width of the least wide working ply 31 and said distance is equal to 0.22 L', such that there is an overlap between the axially inner edge of said half-ply 34 and the edge of the least wide axially continuous ply 31 which is radially to the inside. As for the axially outer end of the half-ply 34, it is axially to the outside of the end of the widest ply 32 and at an axial distance from the equatorial plane XX', such that the difference between said distance and the axial half-width of the widest working ply 32 is equal to 0.37 L'.

The protective reinforcement, which finishes off the crown reinforcement and, radially to the outside of the working reinforcement described above, is formed of two plies 51 and 52 of elastic steel cables. Cables which, under a tensile force equal to the breaking load, have a relative elongation of at least 4% are referred to as elastic, whereas cables are referred to as inextensible when their relative elongation, measured at 10% of the breaking force, is less than 0.2%. The cables of said two plies are crossed from one ply 51 to the next 52, forming angles respectively equal to −24° and +24° with the circumferential direction, the cables of the protective ply 51 closest to the carcass reinforcement being crossed with the cables of the working ply 33 farthest from said carcass reinforcement. The axial width $L_{51}$ of the ply 51 is very much greater than the width $L_{33}$ of the widest working ply, and its end is axially to the outside of the axially outer end of the half-ply 34, such that said protective ply 51 axially covers all the working plies and inserted half-plies. The width $L_{52}$ of the second protective ply is substantially equal to half the total of the widths $L_{32}$ and $L_{33}$ of the two widest working plies.

FIG. 3 shows a variant of a crown reinforcement comprising two half-plies 34, respectively, located between the working plies 31 and 32 and between the working plies 32 and 33, said working plies 31, 32, 33 being in all respects identical to the plies described above. The same applies for the first half-ply 34 relative to the half-ply of FIG. 2. As for the second half-ply 34, between the working plies 32 and 33, it is formed of cables identical to those of the first half-ply which form an angle β of 33° with the circumferential direction, but are crossed with the cables of the first half-ply 34. As for its axial width, it obeys the principles set forth above, with the exception, as is known per se, of not having two ends of a ply in the same parallel plane.

We claim:

1. A tire for heavy equipment, comprising a pair of beads, at least one radial carcass reinforcement anchored within each bead to at least one bead wire, forming an upturn, said reinforcement being surmounted radially to the outside by a crown reinforcement formed of at least three working plies formed of inextensible metal reinforcement elements, which are parallel to each other within each ply and are crossed from one ply to the next forming angles α1, α2, α3 of between 15° and 35° with the circumferential direction, characterized in that the tire further comprises a first half-ply, formed of inextensible metal reinforcement elements and of width L', on either side of the equatorial plane XX', of the tire, arranged radially between the edges of two radially adjacent plies of said at least three working plies, the axially outer and inner ends of said half-ply being located, respectively, axially to the outside of the end of the widest of said two radially adjacent working plies and axially to the inside of the end of the least wide of said two radially adjacent working plies, at distances at least equal to the amount L'/5, the reinforcement elements of said half-ply forming with the circumferential direction an angle β, which firstly is greater in absolute value than 25°, and secondly is greater in absolute value than the largest angle formed by the elements of said two radially adjacent working plies by an amount between 5° and 15°, said two radially adjacent working plies being the closest to the carcass reinforcement of said at least three working plies.

2. A tire according to one of claim 1, characterized in that the reinforcement elements of each half-ply are crossed with the reinforcement elements of the working ply radially to the inside of said half-ply and closest radially to the carcass reinforcement.

3. A tire according to claim 2, characterized in that the widths of the working plies of the crown reinforcement are such that the ply radially to the inside of each half-ply is less wide than the ply radially to the outside of said half-ply.

4. A tire according to claim 3, characterized in that there is present, on either side of the equatorial plane XX', a second half-ply arranged radially between the edges of two radially adjacent working plies of said at least three working plies other than said two radially adjacent working plies located closest to said carcass reinforcement, each second half-ply being formed of the same metal reinforcement elements as those of the first half-ply, said elements of each second half-ply being crossed with the elements of said first half-ply.

5. A tire according to claim 1, characterized in that the working reinforcement is surmounted radially by a protective reinforcement composed of two plies of elastic metal reinforcement elements, one of said protective plies having an axial width greater than the greatest axial width of the working plies.

6. A tire according to claim 5, characterized in that a ply of the protective reinforcement has an axial width greater than the greatest axial width of the working plies and is the radially inner protective ply, whereas the width of the outer protective ply has a width which lies between the largest two widths of the working plies.

7. A tire for heavy equipment, comprising a pair of beads, at least one radial carcass reinforcement anchored within each bead to at least one bead wire, forming an upturn, said reinforcement being surmounted radially to the outside by a crown reinforcement formed of at least three working plies formed of inextensible metal reinforcement elements, which are parallel to each other within each ply and are crossed from one ply to the next forming angles $\alpha 1$, $\alpha 2$, $\alpha 3$ of between 15° and 35° with the circumferential direction, characterized in that the tire further comprises a first half-ply, formed of inextensible metal reinforcement elements and of width L', on either side of the equatorial plane XX' of the tire, arranged radially between the edges of two radially adjacent plies of said at least three working plies, the axially outer and inner ends of said half-ply being located, respectively, axially to the outside of the end of the widest of said two radially adjacent working plies and axially to the inside of the end of the least wide of said two radially adjacent working plies, at distances at least equal to the amount L'/5, the reinforcement elements of said half-ply forming with the circumferential direction an angle β, which firstly is greater in absolute value than 25°, and secondly is greater in absolute value than the largest angle formed by the elements of said two radially adjacent working plies by an amount between 5° and 15°, said reinforcement elements of each half-ply being crossed with the reinforcement elements of the working ply radially to the inside of said half-ply and closest radially to the carcass reinforcement.

8. A tire according to claim 7, characterized in that the widths of the working plies of the crown reinforcement are such that the ply radially to the inside of each half-ply is less wide than the ply radially to the outside of said half-ply.

9. A tire according to claim 8, characterized in that there is present, on either side of the equatorial plane XX', a second half-ply arranged between the edges of two radially adjacent working plies of said at least three working plies other than said two first-mentioned radially adjacent working plies, each second half-ply being formed of the same metal reinforcement elements as those of the first half-ply, said elements of each second half-ply being crossed with the elements of said first half-ply.

* * * * *

UNITED STATES PATENT AND TRADEMARK OFFICE
CERTIFICATE OF CORRECTION

PATENT NO. : 6,598,639 B2 Page 1 of 1
DATED : July 29, 2003
INVENTOR(S) : Comps et al.

It is certified that error appears in the above-identified patent and that said Letters Patent is hereby corrected as shown below:

Column 3,
Line 57, "angles $_1$, $_2$ and $_3$" should read -- angles α1, α2 and α3 --

Column 4,
Line 58, "next forming" should read -- next, forming --

Column 5,
Line 11, "one of" should be deleted

Column 6,
Line 6, "next forming" should read -- next, forming --

Signed and Sealed this

Fourteenth Day of October, 2003

JAMES E. ROGAN
*Director of the United States Patent and Trademark Office*